US011683740B2

(12) United States Patent
Zheng

(10) Patent No.: US 11,683,740 B2
(45) Date of Patent: Jun. 20, 2023

(54) INTELLIGENT 5G NETWORK SLICING

(71) Applicant: T-Mobile USA, Inc., Bellevue, WA (US)

(72) Inventor: Pei Zheng, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 35 days.

(21) Appl. No.: 17/143,060

(22) Filed: Jan. 6, 2021

(65) Prior Publication Data

US 2022/0217610 A1    Jul. 7, 2022

(51) Int. Cl.
*H04W 40/18* (2009.01)
*H04W 28/06* (2009.01)
*H04W 4/24* (2018.01)

(52) U.S. Cl.
CPC ........... *H04W 40/18* (2013.01); *H04W 28/06* (2013.01); *H04W 4/24* (2013.01)

(58) Field of Classification Search
CPC ... H04W 16/00–14; H04W 88/08–182; H04W 4/24
See application file for complete search history.

(56) References Cited

U.S. PATENT DOCUMENTS

| 10,382,903 | B2 | 8/2019 | Shaw et al. | |
|---|---|---|---|---|
| 2016/0353465 | A1* | 12/2016 | Vrzic | H04W 72/12 |
| 2017/0208019 | A1* | 7/2017 | Shimojou | H04L 41/5054 |
| 2018/0317133 | A1 | 11/2018 | Sciancalepore et al. | |
| 2019/0319868 | A1 | 10/2019 | Svennebring et al. | |
| 2020/0045548 | A1* | 2/2020 | Dowlatkhah | H04L 41/40 |
| 2020/0059856 | A1* | 2/2020 | Cui | H04W 24/02 |
| 2020/0187085 | A1* | 6/2020 | Jagannatha | H04W 72/10 |
| 2020/0336415 | A1 | 10/2020 | Dowlatkhah et al. | |
| 2021/0075697 | A1* | 3/2021 | Dattagupta | H04L 41/5067 |

OTHER PUBLICATIONS

CATT, 'Consideration on high-level principle and definition for AI support in NR', R3-206338, 3GPP TSG RAN WG3 Meeting #110-e, Oct. 23, 2020, Sections 1-2, Best available Date: Nov. 2-12, 2020.
International Patent Application No. PCT/US2021/011085, Search Report, dated Apr. 22, 2022, 3 pages.
International Patent Application No. PCT/US2021/011085, Written Opinion, dated Apr. 22, 2022, 5 pages.
Samsung, 'Discussion on NR QoE solutions', R3-206036, 3GPP TSG RAN WG3 Meeting #110-e, Oct. 23, 2020, section 2.5.1, Best available Date: Nov. 2-12, 2020.

* cited by examiner

*Primary Examiner* — San Htun
(74) *Attorney, Agent, or Firm* — Han Santos, PLLC

(57) ABSTRACT

Described herein are techniques for implementing intelligent network slicing. Such techniques may include receiving data usage information associated with at least one user and generating, using the data usage information, a predicted usage model for the at least one user. Upon identifying an upcoming predicted usage event from the predicted usage model, the techniques may further include determining a current status of a core network and upon determining, based on the current status of the core network, that the core network is inadequate to handle the upcoming predicted usage event, instantiating a new network slice within the core network configured to handle the upcoming predicted usage event. Upon identifying network traffic associated with the upcoming predicted usage event, the techniques comprise routing that network traffic through the new network slice.

20 Claims, 5 Drawing Sheets

INTELLIGENT 5G NETWORK SLICING

BACKGROUND

While mobile devices were once used almost exclusively for phone calls, those mobile devices are now also used to access a variety of online services. To support this, wireless carrier networks have developed systems capable of routing network traffic between mobile devices and application servers that provide those online services. Wireless carrier networks have continued to improve these systems over time with each "generation" of wireless network.

SUMMARY

Techniques are provided herein for implementing intelligent network slicing. In some embodiments, such techniques may comprise obtaining data usage information from a plurality of users and generating, from the obtained data usage information, a predicted usage model that indicates future predicted usage events. In some embodiments, upon determining that a predicted data usage event is to occur in the near future, information about a network may be obtained and a current status of that network may be determined. A determination may then be made as to whether the network is capable of supporting the predicted data usage event. Upon determining that the regular provisioning of the core network is not currently able to optimally handle the predicted data usage event, a network slice may be instantiated that is configured to handle the predicted data usage event.

In one embodiment, a method is disclosed as being performed by a wireless carrier network, the method comprising receiving data usage information associated with at least one user, generating, using the data usage information, a predicted usage model for the at least one user, identifying, based on the predicted usage model for the user, an upcoming predicted usage event pertaining to a service, determining the current status of network provisioning for the service, upon determining, based on the current status of the network, that the regular provisioning is inadequate to handle the upcoming predicted usage event, instantiating a new network slice within the network configured to handle the upcoming predicted usage event, and upon identifying network traffic associated with the upcoming predicted usage event, routing that network traffic through the new network slice.

An embodiment is directed to a computing device comprising: a processor; and a memory including instructions that, when executed with the processor, cause the computing device to, at least receive data usage information associated with a user, generate, using the data usage information, a predicted usage model for the user, identify, based on the predicted usage model for the user, an upcoming predicted usage event, determine a current status of a network, upon determining, based on the current status of the network, that the network is inadequate to handle the upcoming predicted usage event, instantiate a new network slice within the network configured to handle the upcoming predicted usage event, and upon identifying network traffic associated with the upcoming predicted usage event, route that network traffic through the new network slice.

An embodiment is directed to a non-transitory computer-readable media collectively storing computer-executable instructions that upon execution cause one or more computing nodes to collectively perform acts comprising generating, using the data usage information, a predicted usage model for the user, identifying, based on the predicted usage model for the user, an upcoming predicted usage event, determining a current status of a network, upon determining, based on the current status of the network, that the network is inadequate to handle the upcoming predicted usage event, instantiating a new network slice within the network configured to handle the upcoming predicted usage event, and upon identifying network traffic associated with the upcoming predicted usage event, routing that network traffic through the new network slice.

The foregoing, together with other features and embodiments will become more apparent upon referring to the following specification, claims, and accompanying drawings.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
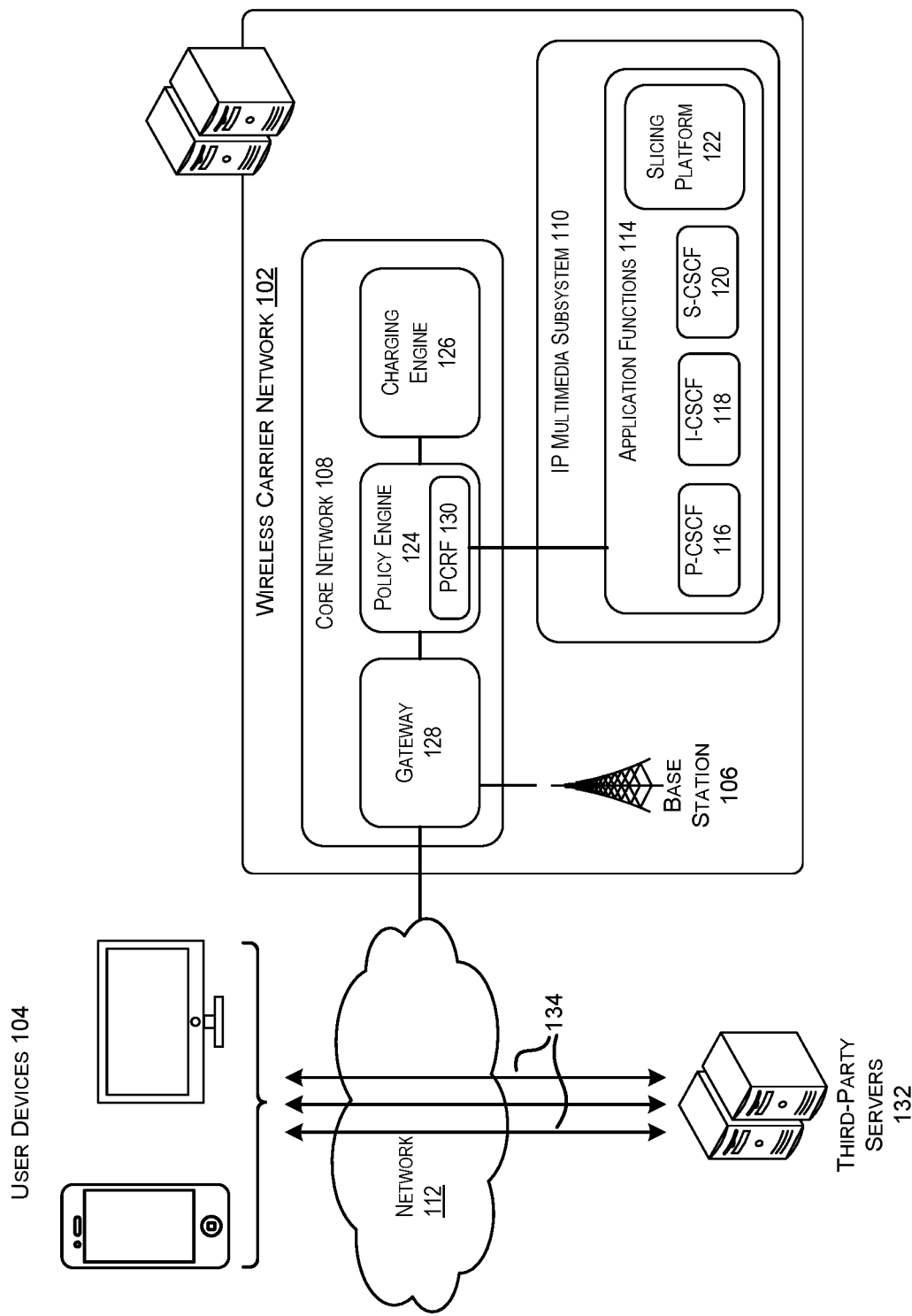
FIG. 1 illustrates an example architecture of a wireless carrier network for implementing techniques for providing intelligent network slicing in accordance with embodiments of the disclosure.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

In Fifth Generation (5G) wireless networks, network slicing provides the ability to isolate network traffic within the wireless network. A network slice refers to a portion of bandwidth (and processing power) reserved on a network for a particular type of data transmission. More particularly, in 5G wireless networks, a provider of an online service can request that network traffic directed to and from that online service provider be assigned to a particular network slice dedicated to that service provider. This allows traffic to and from that online service provider to be transmitted unhindered by regular network traffic. This, in turn, allows the network traffic for the online service to be routed even if the wireless carrier network is otherwise heavily congested.

This disclosure describes techniques that may be used to implement network slices that are configured to handle predicted data usage events in a dynamic manner. To do this, data usage information may be obtained in relation to a plurality of users of online services provided via a core network of a wireless carrier network. That data usage information may be used to identify data usage patterns for particular users using various machine learning techniques. Such data usage patterns may then be used to predict data usage events during which certain users are likely to access various online services.

Upon identifying predicted data usage events likely to occur in the near future, a current status of a core network may be assessed in order to determine its suitability to handle the predicted data usage events. Upon determining that the core network may not be able to handle the predicted data usage event in a suitable (e.g., efficient) manner, a new network slice may be instantiated within the core network to handle the predicted data usage event.

Embodiments of the disclosure provide for a number of advantages over conventional systems. For example, embodiments of the disclosure enable more efficient use of available computing resources. It should be noted that a conventional core network may use a main slice along with a number of network slices. The main slice is typically used to process network traffic that is not associated with a dedicated network slice. However, this requires that the main slice include implementations of various computing resources (e.g., applications and services) that may not be necessary for processing every type of network traffic that passes through it. Many of these resources must be scaled based on network traffic, making the use of the main slice less than ideal for all network traffic. In contrast, embodiments of the system described herein enable a more efficient use of resources. A network slice can be instantiated to handle a data usage event and may be catered to (e.g., include only enough computing resources to process) that data usage event. After the predicted data usage event has concluded, the network slice can be removed, freeing up the computing resources. This minimizes the computing resources needed to handle any particular data usage event.

FIG. 1 illustrates an example architecture of a wireless carrier network for implementing techniques for providing intelligent network slicing in accordance with embodiments of the disclosure. The architecture 100 may include a wireless carrier network 102 that serves multiple user devices, such as user devices 104. The user device 104 may include any of a feature phone, a smartphone, a tablet computer, a phablet, an embedded computer system, a personal computing device, network connected device (e.g., an Internet of Things (IoT) device) or any other device that is capable of using the wireless communication services that are provided by the wireless carrier network 102 to communicate with other electronic devices.

The wireless carrier network 102 may include multiple base stations, such as the base station 106, as well as a core network 108 and an IP Multimedia Subsystem (IMS) core 110. The wireless carrier network 102 may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long-term Evolution (LTE), CDMA-2000 (Code Division Multiple Access 2000), $4^{th}$ Generation (4G), $5^{th}$ Generation (5G), and/or so forth. The base stations are responsible handling data traffic between user devices and the core network 108. In some embodiments, the base stations may be in the form of eNodeB nodes. Each eNodeB node may include a base transceiver system (BTS) that communicates via an antenna system over an air-link with one or more user devices that are within range. The antenna system of an eNodeB node may include multiple antennas that are mounted on a radio tower to provide a coverage area that is referred to as a "cell." The BTS may send RF signals to user devices and receive radio signals from user devices.

The core network 108 may provide telecommunication and data communication services to multiple user devices 104. For example, the core network 108 may connect the user devices 104 to other telecommunication and data communication networks, such as a network 112 and/or a public switched telephone network (PSTN). Accordingly, data packet communications via the core network 108 and the network 112 may support a variety of services provided via a remote connection.

In various embodiments, an IMS core 110 may reside on the wireless carrier network 102. The IMS core 110 may include one or more application functions 114. In various embodiments, the application functions 114 may include a Proxy Call Session Control Function (P-CSCF) 116, Interrogating Call Session Control Function (I-CSCF) 118, Serving Call Session Control Function (S-CSCF) 120 or an equivalent function. In instances in which the application functions 114 include the P-CSCF 116, the P-CSCF 116 may route incoming SIP messages to an IMS registrar server. The P-CSCF 116 may also safeguard the security of the IMS core 110 by handling Internet Protocol Security (IPSec) for communications that are exchanged by the user devices 104. In some alternative instances, instead of SIP sessions, the P-CSCF may handle Remote Authentication Dial-In User Service (RADIUS) sessions. The P-CSCF may interact with the I-CSCF 118, and S-CSCF 120. The S-CSCF may communicate with a telephony application server (TAS) that resides in the core network 108. The TAS may route voice and/or data communications within the wireless carrier network 102 and with other networks, including public switch telephone networks (PSTNs). For example, the TAS may be a SIP application server that handles IP telephony for voice over LTE (VoLTE) services. Collectively, the CSCFs may handle Session Initiation Protocol (SIP) sessions, which are communication sessions for packet-based voice and video calls, instant messaging over IP networks, and/or so forth. The application functions 114 may further include slicing platform 122 configured to assign network resources to a network slice based on expected usage patterns. This is described in greater detail below.

The core network 108 may further include a policy engine 124, a charging engine 126, and a gateway 128. The policy engine 124 may be a software component that determines policy and enforces policy rules and serves to establish calls and allocate bandwidth to communications routed via the wireless carrier network. In various embodiments, the policy engine 124 may include a Policy and Charging Rules Function (PCRF) 130 or another equivalent core network component of the wireless carrier network 102. Accordingly, the policy engine 124 may interface with the application functions 114 to handle incoming and outgoing communications.

The charging engine 126 may enable the wireless carrier network 102 to monitor the services, such as data, voice, text, etc., that are used by each subscriber, and charge the subscribers in real-time based on service usage. In various embodiments, the charging engine 126 may be an Online Charging System (OCS) or another equivalent core network component of the wireless carrier network 102.

The gateway 128 may include one or more servers and related components that are tasked with providing connectivity between the IMS core 110, the user devices 104, and one or more third-party servers 132 by acting as a point of entry and exit for data traffic. In turn, the IMS core 110 may provide the user devices with data access to external packet data networks 112, such as the networks of other wireless telecommunication providers or the Internet. Accordingly, the gateway 128 may perform functions such as policy enforcement, packet filtering, packet screening, and/or charging support. In various embodiments, the gateway 128 may be a Packet Data Network Gateway (PGW) or another equivalent core network component of the wireless carrier network 102.

In some embodiments, the gateway 128 may manage one or more network slices 134. Each network slice may represent a number of resources (e.g., server bandwidth, etc.) dedicated to a particular portion of network traffic. For example, a network slice may consist of a portion of processing power for a number of servers that is dedicated to transmission of network traffic for a specific online service. In some embodiments, the network 112 may include a number of computing devices in a distributed computing environment (e.g. a cloud computing environment). In these embodiments, a network slice may be represented as a virtual machine instantiated in the distributed computing environment for the particular network traffic.

In some embodiments, a user device 104 may be any suitable electronic device capable of interacting with at least one other electronic device (e.g., third-party servers 132) in order to consume online services. In some embodiments, the user device 104 may include one or more outputs (e.g., a display, speakers, etc.) via which multimedia content may be presented to a user. Additionally, the user device 104 may include one or more input devices configured to collect input from a user of the user device. The user device 104 may include a memory that stores computer executable instructions.

As depicted in FIG. 1, a user may be associated with a number of different user devices 104. The types/models of user devices 104 may vary, as may be a primary function performed by each of those user devices. Each of the user devices 104 may be associated with a particular user and/or account with the wireless carrier network by virtue of having accessed one or more online services using the account. In some embodiments, the wireless carrier network may monitor network traffic to and from each of those different user devices in order to obtain data usage patterns for the user. Such data usage patterns may include information regarding which online services are accessed by each user device as well as various metrics for that information (e.g., an amount of time, amount of data, types of data, etc.). Data usage metrics collected from a variety of user devices 104 associated with a user may be aggregated to identify general patterns in network traffic.

By way of illustrating various interactions between the components depicted in architecture 100, consider the following exemplary scenario. In this scenario, a user, such as an operator of at least one of the user devices 104, may use the user devices 104 to access various online services over the course of some period of time. Based on that usage, a prediction model may be generated (e.g., using one or more machine learning algorithms) that models future predicted usage (e.g., amounts, times, etc.) of online services by the user. Bandwidth usage predicted for that future usage may then be compared to an expected bandwidth availability determined based on historical usage patterns by a plurality of users to determine whether a predicted available bandwidth can accommodate the user's predicted bandwidth usage. If the predicted available bandwidth is insufficient to accommodate the user's predicted bandwidth usage, then the slicing platform 122 may allocate a number of resources to create a new network slice of a size sufficient for the user's predicted bandwidth usage at the predicted time. While the network slice is open, any traffic to and from the user's user devices 104 is routed over that network slice.

Figure 2:
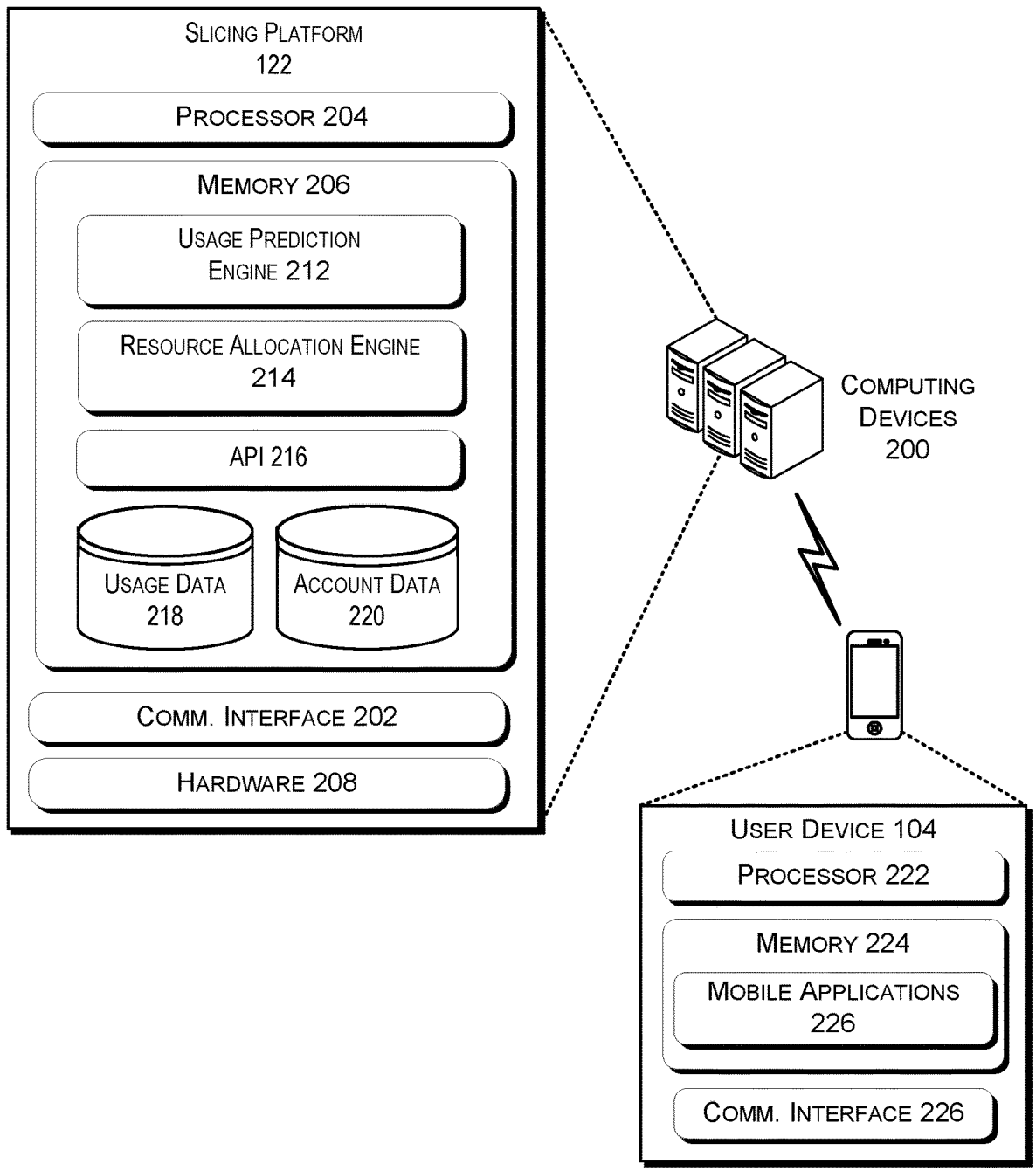
FIG. 2 is a block diagram showing various components of a system architecture that supports intelligent network slicing in accordance with embodiments.

FIG. 2 is a block diagram showing various components of a system architecture that supports intelligent network slicing in accordance with embodiments. The system architecture may include one or more computing devices 200 on which a slicing platform 122 is implemented. The computing devices 200 may include a communication interface 202, one or more processors 204, memory 206, and hardware 208. The communication interface 202 may include wireless and/or wired communication components that enable the computing devices 200 to transmit data to, and receive data from, other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 204 and the memory 206 of the computing devices 200 may implement functionality from or one or more software modules and data stores. Such software modules may include routines, program instructions, objects, and/or data structures that are executed by the processors 204 to perform particular tasks or implement particular data types. The one or more software modules may include at least a module for generating a usage prediction model (e.g., usage prediction engine 212) as well as a module for allocating one or more resources to a network slice (e.g., resource allocation engine 214). The memory may include an application programming interface (API) 216 that enables interaction between a user device or third-party server and the slicing platform 122. For example, a user device or third-party server may submit a request to the slicing platform by calling one or more methods available via the API 216. Additionally, the memory 206 may include one or more data stores that includes at least a database containing historical user usage data for a plurality of users (e.g., usage data 218) and information associated with one or more user accounts (e.g., account data 220).

The usage prediction engine 212 may be configured to generate a predicted usage model that represents data usage patterns in that it indicates a pattern of network usage patterns. Such predicted usage models may be generated for a particular user, a particular, user account, and/or a set of user devices, as well as for a broad consumer base of the wireless carrier network. In some embodiments, predicted usage models may be generated for each of a number of existing network slices implemented within the wireless carrier network to predict a likely amount of network traffic utilizing those existing network slices.

In order to generate a predicted usage model, the usage prediction engine 212 may use one or more machine learning algorithms. For example, a machine learning module may be provided with historical network traffic information in order to generate a trained model that is able to detect usage patterns within the network traffic information. Once such a model has been trained, the usage prediction engine 212 may use the predicted usage model to identify data usage patterns. In some embodiments, the usage prediction engine 212 may identify periods of time during which a predicted data usage for a user exceeds a predicted availability of bandwidth for a main network slice. In these embodiments, the usage prediction engine 212 may further determine an amount of that predicted data and a period of time over which it is likely to last. Upon identifying a predicted data usage that exceeds a predicted available bandwidth, the usage prediction engine 212 may call the resource allocation engine to allocate a network slice to accommodate that predicted data usage.

The resource allocation engine 214 may be configured to identify and assign resources in order to create a network slice. In some embodiments, the wireless carrier network includes a cloud computing environment, and each network slice is comprised of one or more virtual machines, that each emulate a computing device dedicated to the network slice. In some embodiments, each network slice is comprised of one or more software containers that consists of an isolated runtime environment that includes an application plus all its dependencies, such as libraries, other binaries, and configuration files. The resource allocation engine 214 may instantiate (i.e., "spin up") a virtual machine or software container that acts as a network slice to handle specified network traffic. The virtual machine may be allocated enough processing power to handle the amount of network traffic that the network slice is intended to process.

It should be noted that a network slice can be any logical set of network functions instantiated on a set of computing resources (e.g., generic computing resources) to service a particular type of network traffic. Each network slice may be created, configured, reconfigured, or deactivated by the resource allocation engine 214. In some cases, each network slice may include at least a control plane and a user plane. In these cases, the control plane operations are separately processed from user plane operations. The control plane network traffic can be used to access, coordinate and/or otherwise manage network traffic of the user plane.

The user device 104 may be any electronic device capable of interacting with the computing devices 200 as described herein. The user device 104 may include a processor 222 and a computer readable memory 224 as well as a communication interface 226. The memory 224 may include a number of mobile applications 228. Such mobile applications 228 may be configured to enable a user of the user device to access one or more online services provided by respective third-party service providers. In some embodiments, a user (or user account) may be associated with a number of different user devices.

During the course of routing data between one or more user device 104 and a respective provider of an online service, the slicing platform 122 may collect metrics associated with that data. For example, the slicing platform 122 may collect information on what online services are being consumed by each of the user devices, what dates/times each of those online services are being consumed, what amounts of data are being routed between the devices, and any other suitable metrics. The slicing platform 122 may store this information within the usage data 218 for use by the usage prediction engine 212.

Figure 3:
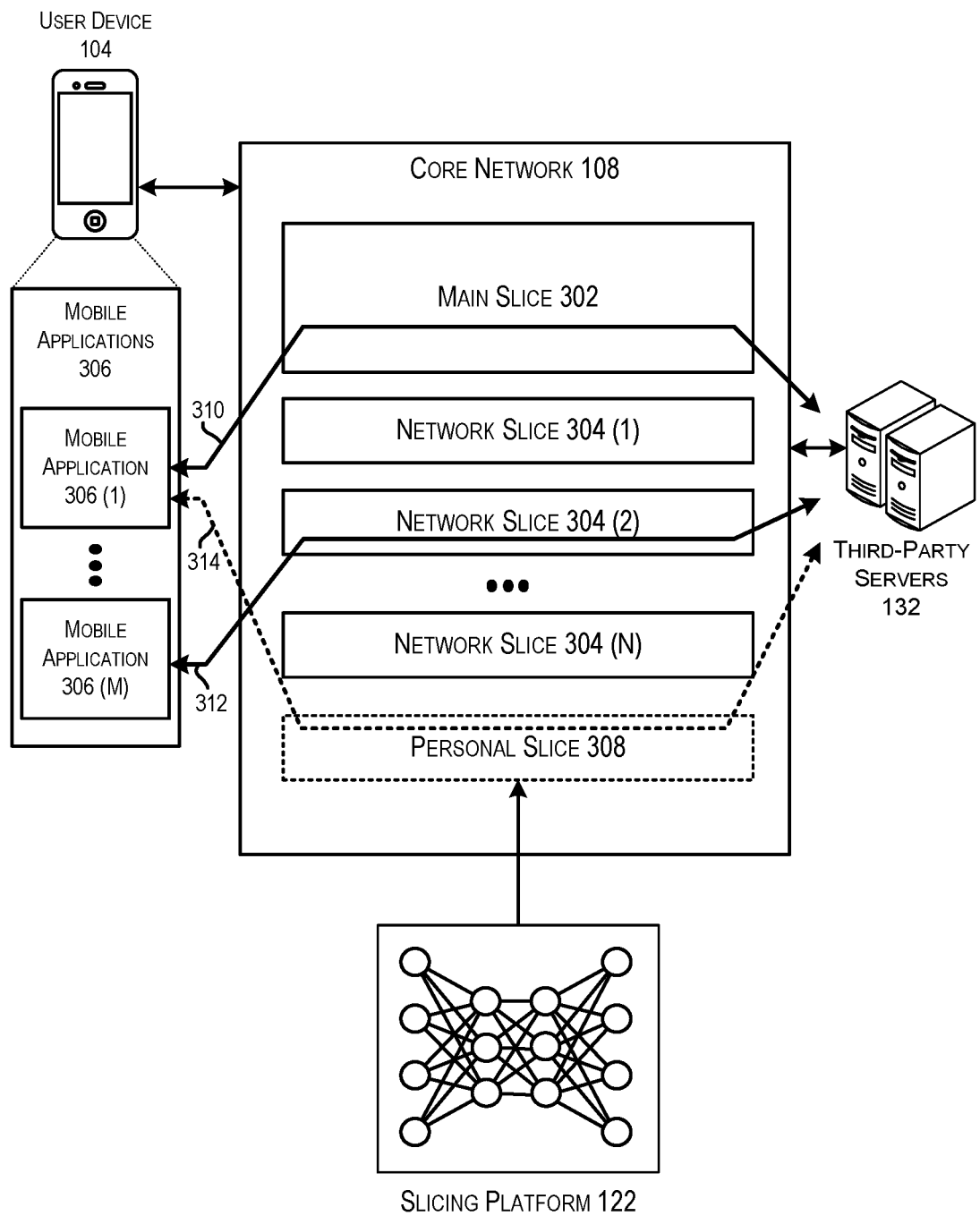
FIG. 3 depicts an illustrative example of an implementation of intelligent network slicing in accordance with at least some embodiments.

FIG. 3 depicts an illustrative example of an implementation of intelligent network slicing in accordance with at least some embodiments. This illustrative example depicts aspects of a core network 108 of a wireless carrier network that provides communication capabilities between one or more user devices 104 and one or more third-party servers 132. As depicted, a core network may include an infrastructure that is divided into a number of network slices. In some embodiments, such an infrastructure may include a main slice 302 over which general network traffic is routed as well as a number of network slices 304 (1-N) each dedicated to processing a particular network traffic type. For example, each of the network slices 304 may be dedicated to processing network traffic associated with a different online service or to and from a different third-party server.

In some embodiments, the core network may include a Software Defined Network (SDN) in which the forwarding process of network packets (e.g., as managed by a data plane) is disassociated from the routing process (e.g., as managed by a control plane) for those data packets. In some embodiments, the core network may be implemented within a cloud-computing environment. In such a core network, particular network slices may be implemented within separate virtual machines (VMs) or software containers. Resources within each VM may be customized to process a particular type of network traffic. For example, each VM may include an instance of a virtualized environment that includes compute, storage and data center networking configured to process the associated type of network traffic. Additionally, each VM may include a different number of resources. For example, a VM dedicated to a first network slice may include fewer or more computing resources than a VM dedicated to a second network slice.

In some embodiments, the user device can communicate with the core network via a wireless communication link. For example, the user device might be a mobile communication device (e.g., a phone) that communicates via a cellular communication link through a Radio Access Network (RAN). A mobile communication network, such as a network (e.g., 3G, 4G, 5G, etc.) that uses a Long-Term Evolution (LTE) standard for wireless broadband communication may establish wireless connectivity to the user device while allowing that user device to change its location. Such a network may be configured to seamlessly hand off a communication session with a particular user device between base stations as the user device changes locations. In some embodiments, the user device may establish a communication session with the core network via an alternative to the mobile communication network. For example, the user device may connect to the core network via a Wi-Fi network link. Such a Wi-Fi network link can be a Wireless Local Area Network (WLAN) connection that is supported by a proximately located router or other suitable electronic device acting as a proxy (e.g., another mobile device with an implemented HotSpot).

The core network may further establish communication with one or more third-party servers via a connection over a second network. For example, the core network may maintain one or more access points for ingress/egress to a network such as the Internet. In some cases, such an access point may be managed by an Internet Service Provider (ISP) that facilitates communication between the core network and one computing devices on the second network. In some embodiments, multiple access points may be maintained by the core network. In these embodiments, an access point may be used by the core network to access the second network based on a geographical proximity of the access point to the relevant user device or third-party server.

In some embodiments, the core network includes a default network slice that may be referred to as a main slice 302. The main slice 302 may be configured to process any/all network traffic that is not processed by one or more of the network slices 304. Accordingly, the main slice may include instances of a variety of different resources that may not be necessary for processing all types of traffic because of the variety of network traffic handled by the main slice.

As depicted, the core network may further include a number of network slices 304. Each such network slice may be configured to process a particular subset of network traffic. In some embodiments, each network slice may be associated with a third-party server that provides one or more online services to various user devices. In these embodiments, each network slice may be configured to process network traffic originating at, or being routed to, a particular third-party server. In some cases, each third-party server may be associated with multiple network slices, such that each of the multiple network slices may be configured to process network traffic associated with a different online service provided by the third-party server. As described elsewhere, the core network may include a gateway (e.g., gateway 128 as described with respect to FIG. 1) that is configured to route network traffic. Such a gateway may be configured to route network traffic received at the core network to a network slice appropriate for that network traffic.

In some embodiments, the user device may include a number of mobile applications 306. One or more of the mobile applications 306 (1-M) may provide the user device with access to an online service supported by one of the third-party servers. For example, one mobile application may be configured to provide a user with access to streaming videos hosted by a streaming service provider. In this example, a network slice may be instantiated within the core network to handle streaming video traffic between various user devices and the streaming service provider. In some cases, the network slice may be configured to handle all streaming video data regardless of its point of origin. In other cases, the network slice may be configured to handle all data transmissions to and/or from the streaming service provider (or alternatively data transmissions associated with the mobile application). While a number of mobile applications are depicted in this example, it should be noted that some services may not require the use of a mobile application on a user device. For example, a user may access an online service provided by a third-party server via a website maintained and operated by the third-party server. In this example, requests directed to such a website may be routed via a network slice dedicated to the third-party server.

The core network may be in communication with a slicing platform 122. The slicing platform may be configured to determine whether a current operating status of the core network is sufficient to meet the needs of an upcoming predicted usage for a user, and if not, instantiate a new network slice (e.g., personal slice 308) to meet those needs. As discussed elsewhere, this may comprise the use of a machine learning algorithm to predict and model data usage patterns for a user. The slicing platform may then be configured to identify upcoming predicted data usage for a user and to determine whether a current status of the network provides optimal conditions for processing that data usage. Upon detecting that a current load on the core network is such that the core network would be too congested to handle an upcoming predicted usage for a user, the slicing platform may be configured to generate personal slice 308 as a network slice dedicated to handling the predicted usage data. In some embodiments, the personal slice 308 is configured to include resources needed to handle the type(s) of data associated with the data usage. Additionally, the network slice can be assigned just enough computing resources to handle the predicted data usage. This allows the personal slice 308 to be optimized to handle data of the type in the predicted data usage while minimizing the resources used to do so. It should be noted that while the personal slice may compete with the main slice for computing resources, the personal slice provides a more optimal use of such resources. For example, use of a personal slice in this manner allows a larger amount of network traffic to be processed per computing resource versus the main slice in which a number of services must be instantiated to account for a multitude of data types. Accordingly, the use of a personal slice in this manner can reduce the overall load on the core network.

By way of illustrating various interactions between the components depicted in FIG. 3, consider the following scenario. During execution of a first mobile application 306 (1), the user device may interact with a first third-party server to receive data 310 in relation to an online service. During this interaction, the data 310 may be routed between the user device and the first third-party server by the core network. A gateway of the core network may determine that the first third-party server is not associated with any dedicated network slice. Accordingly, the data 310 may be routed by the gateway through the main slice 302. Additionally, the slicing platform may identify, based on metrics and timing collected with respect to the transmission of data 310, one or more predicted future usages of the mobile application 306 (1).

Continuing with the above scenario, during execution of a second mobile application 306 (M), the user device may interact with a second third-party server to receive data 312 in relation to a second online service offered by the second third-party server. During this interaction, the data 312 may be routed between the user device and the second third-party server by the core network. The gateway of the core network may determine that the second third-party server is associated with network slice 304 (2), and the data 312 may be routed by the gateway through network slice 304 (2). Additionally, the slicing platform may identify, based on metrics and timing collected with respect to the transmission of data 312, one or more predicted future usages of the mobile application 306 (M).

At a subsequent time, the slicing platform may determine, using determined predicted future usage data, that there is a high probability (e.g., above some predetermined threshold probability) that mobile application 306 (1) will be executed within some determined amount of time. In this example, the slicing platform may further determine, using current metrics obtained from the core network, that the main slice is currently too congested (e.g., a current load on the main slice is greater than a predetermined threshold load size). Upon making this determination, the slicing platform may identify a combination of computing resources (e.g., both type and amount) necessary to handle the network traffic 314 between the user device and the first third-party server. The slicing platform then generates a personal slice 308 that has allocated the identified combination of computing resources. Upon detecting the network traffic 312, the gateway routes that traffic though the newly generated personal slice 308. In some embodiments, the personal slice 308 is uninstantiated upon reaching a predicted end time for the mobile application 306 (1) as determined via the predicted future usage data.

Figure 4:
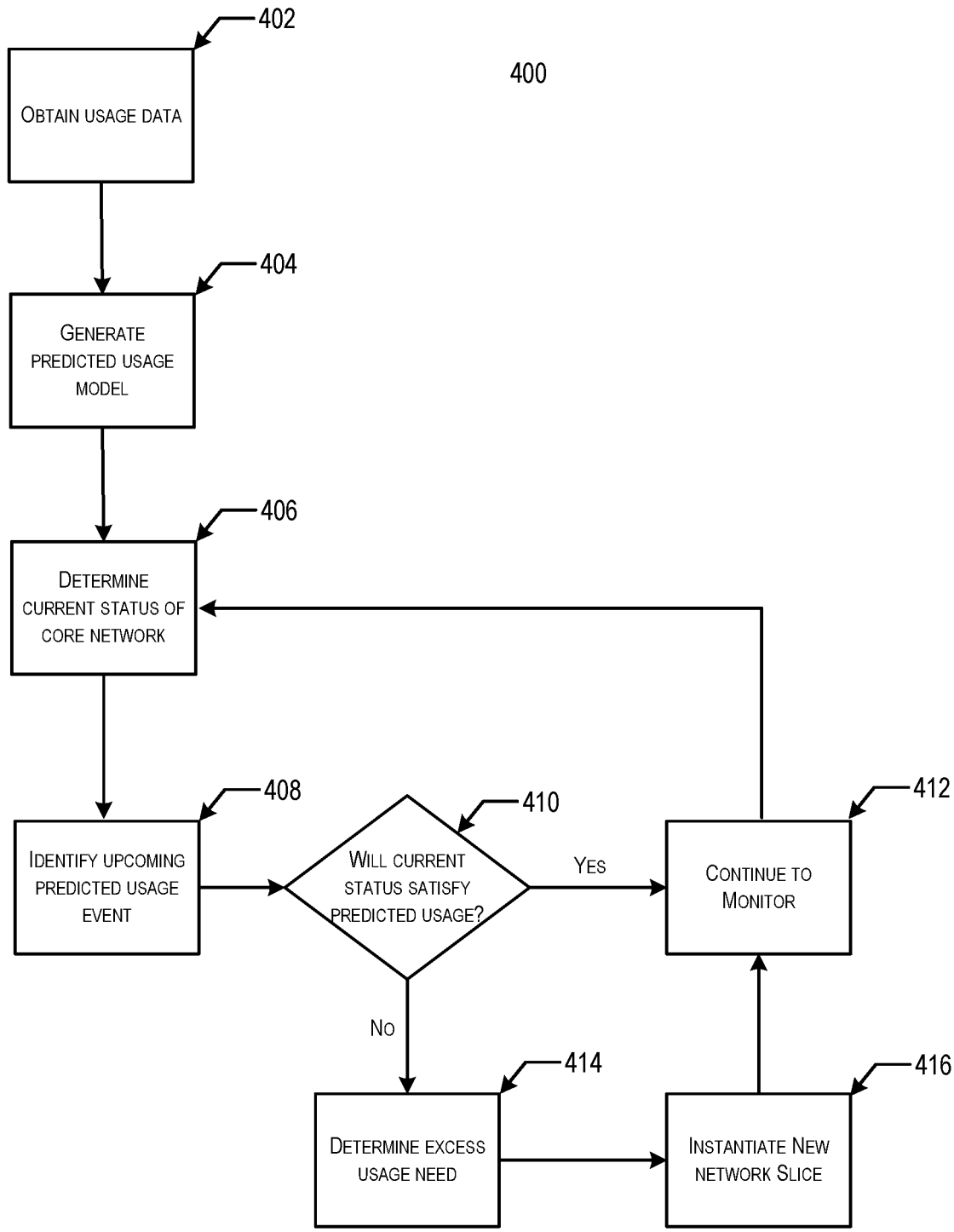
FIG. 4 depicts a block diagram showing an example process flow for implementing intelligent network slicing in accordance with embodiments.
Figure 5:
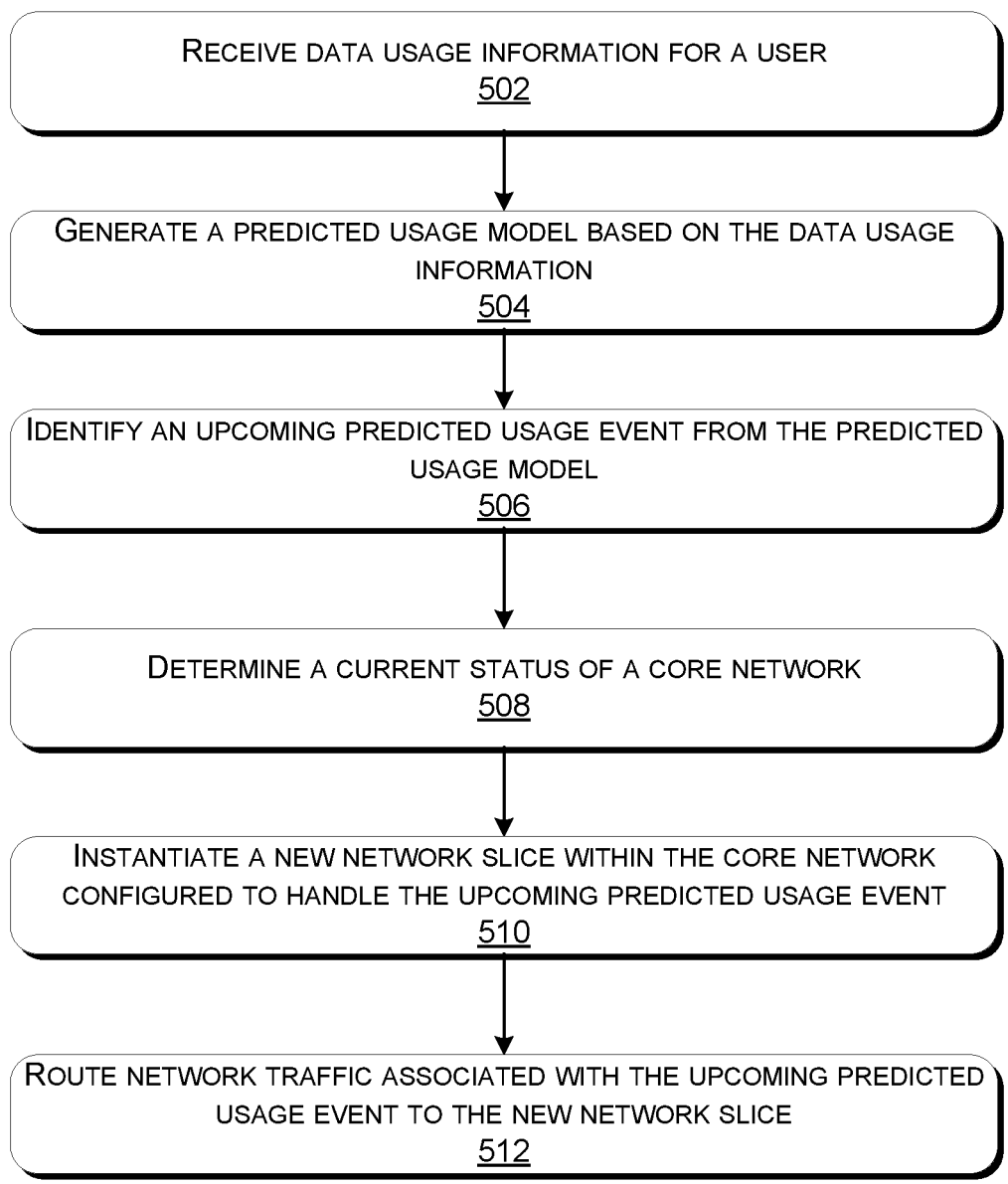
FIG. 5 depicts a flow diagram showing an example process flow for instantiating a new network slice to process a predicted data usage event in accordance with embodiments.

FIGS. 4 and 5 present illustrative processes 400 and 500 for implementing intelligent network slicing. Each of the processes 400 and 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400 and 500 are described with reference to the architecture 100 of FIG. 1.

FIG. 4 depicts a block diagram showing an example process flow for implementing intelligent network slicing in accordance with embodiments. The process 400 may be performed by a slicing platform within a wireless carrier network (e.g., slicing platform 122 as described with respect to FIG. 1).

At 402 of the process 400, usage data is received that indicates one or more metrics associated with network traffic. Such metrics may indicate a load or bandwidth of the network traffic (and corresponding dates/times), types of data included within the network traffic, originator identities and recipient identities, or any other suitable information. Usage data may be received in relation to a plurality of user devices and processed as an aggregate. In some embodiments, the slicing platform is in constant communication with the core network and receives usage data from the core network in real time.

At 404 of the process 400, usage data associated with a particular user may be used to generate predicted usage data (e.g., via a usage prediction engine 212) for that user. Such predicted usage data may include an implementation of one or more determined data usage patterns for the user into future dates/times. The usage data may indicate a probability of future mobile application executions and/or future consumption of online services via one or more user devices for that user. For example, if a user has a tendency to stream video data every Friday evening from 7:00 μm to 7:45 pm, then the predicted usage data may indicate a high probability that the user will stream video data on the upcoming Friday evening from 7:00 μm to 7:45 pm.

At 406 of the process 400, the slicing platform determines a current status of a core network. This comprises processing the usage data received at 402 to determine a current load on the core network. In some embodiments, a current status may be determined for each of a number of network slices. For example, the slicing platform may determine a current load on a main slice as well as a current load on each of a number of other network slices.

At 408 of the process 400, one or more upcoming predicted usage events is identified with respect to a particular user or user device. A predicted usage event may be identified as a data transmission event in which some amount of data is determined to be likely to be transmitted between a user device and one or more third-party servers. In some embodiments, the predicted usage event may be identified upon determining that a likelihood of the usage event occurring is greater than a predetermined threshold probability as indicated within the predicted usage model. In some cases, the predicted usage event may be identified by virtue of being predicted to occur within a predetermined threshold amount of time into the future from the present.

At 410 of the process 400, a determination is made as to whether the current status of the core network (as determined at 406) is sufficient to handle the identified predicted usage event. This may comprise identifying a network slice to be associated with the predicted usage event as well as a current load on that network slice. A determination is then made as to whether a load associated with the predicted usage event, when added to the current load on the identified network slice, would result in a total load that is greater than a predetermined threshold load amount. In some cases, this may comprise determining whether the total load is greater than a predetermined threshold percentage of a bandwidth available to the network slice.

Upon determining that a predicted total load on the network slice would not exceed a threshold load amount (e.g., "Yes" from the decision block 410), the process 400 may involve continuing to monitor the core network for further predicted usage events.

Upon determining that a predicted total load on the network slice would exceed a threshold load amount (e.g., "No" from the decision block 410), the process 400 may involve determining an excess usage need for the predicted usage event at 414. In some embodiments, the excess usage need may comprise an amount of bandwidth by which the predicted total load (i.e., current load plus the predicted load) would exceed the threshold load amount. In some embodiments, the excess usage need may comprise a bandwidth needed to handle the entirety of the predicted load. The process may then comprise identifying a number of computing resources sufficient to handle the determined excess usage need.

At 416 of the process 400, a new network slice is instantiated by allocating a number of computing resources toward such a network slice. The allocated number of computing resources may be dedicated to processing network data associated with the identified upcoming predicted usage event. In some embodiments, the number of computing resources may be allocated to a network slice for a period of time that corresponds to the predicted usage event. As noted elsewhere, once the new network slice has been instantiated, network traffic associated with the predicted usage event is then routed through the core network via that new network slice. In some cases, such network traffic is identified by virtue of originating at, or being directed toward, a user or a user device associated with the predicted usage event.

FIG. 5 depicts a flow diagram showing an example process flow for instantiating a new network slice to process a predicted data usage event in accordance with embodiments. The process 500 may be performed by a computing device within a wireless carrier network. For example, the process 500 may be performed by a server that performs the functionality attributed to the slicing platform 122 as described herein.

At 502, the process 500 comprises receiving data usage information with respect to at least one user. In some embodiments, the user is associated with one or more user devices.

At 504, the process 500 comprises generating a predicted usage model based on the received data usage information. In some embodiments, the predicted usage model is generated using one or more machine learning techniques. In some embodiments, the predicted usage model may include an indication of a likelihood that the upcoming predicted usage event will occur and a time at which the usage event will likely occur.

At 506, the process 500 comprises identifying an upcoming predicted usage event from the predicted usage model. In some embodiments, the upcoming predicted usage event comprises an event in which an online service is accessed. In some embodiments, the upcoming predicted usage event is identified by virtue of a likelihood that the upcoming predicted usage event will occur within a predetermined amount of time.

At 508, the process 500 comprises determining a current status of a core network. In some embodiments, the current status of the core network is determined based on one or more metrics obtained from the core network. In some embodiments, the current status of the core network comprises an extent to which a current load on the core network takes up an available bandwidth of the core network. Additionally, the process 500 may further comprise determining whether the core network is adequate to handle the upcoming predicted usage event. In some cases, determining whether the core network is adequate or inadequate to handle the upcoming predicted usage event comprises determining whether a total of the current load and a load associated with the upcoming predicted usage event is greater than a predetermined threshold load. In some cases, the threshold load comprises a percentage of the available bandwidth of the core network.

In some embodiments, the core network comprises a main slice and at least one additional network slice. In these embodiments, each of the at least one additional network slice is dedicated to a particular type of network traffic.

At 510, the process 500 comprises instantiating a new network slice within the core network, the new network slice being configured to handle the upcoming predicted usage event. In some embodiments, instantiating a new network slice within the core network configured to handle the upcoming predicted usage event comprises identifying a number of computing resources associated with the upcoming predicted usage event and allocating the number of computing resources to the new network slice. In some cases, the number of computing resources represents a minimum necessary computing resources required to process the network traffic associated with the upcoming predicted usage event.

At 512, the process 500 comprises routing network traffic associated with the upcoming predicted usage event through the new network slice. In some embodiments, the network traffic associated with the upcoming predicted usage event is identified based on it originating from, or being directed to, one or more user devices associated with the user. In some embodiments, the new network slice may be removed at the conclusion of the upcoming predicted usage event.

What is claimed is:

1. A method comprising:
receiving, at a wireless carrier network, data usage information associated with a first user account;
generating, by the wireless carrier network using the received data usage information, a predicted usage model for the first user account;
identifying, by the wireless carrier network based on the predicted usage model for the first user account, that a probability for an occurrence of an upcoming predicted usage event associated with the first user account within a predetermined amount of time exceeds a predetermined probability threshold;
in response to the probability for the occurrence of the upcoming predicted usage event exceeding the predetermined probability threshold, determining, by the wireless carrier network, a current status of a core network associated with the first user account provided by the network for the usage event;
upon determining, by the wireless carrier network based on the current status of the core network, that the core network is inadequate to handle the upcoming predicted usage event associated with the first user account, instantiating a personal slice within the core network dedicated to handle the upcoming predicted usage event associated with the first user account; and
upon identifying network traffic associated with the upcoming predicted usage event, routing that network traffic through the personal slice.

2. The method of claim 1, wherein the predicted usage model is generated using one or more machine learning techniques.

3. The method of claim 1, wherein the upcoming predicted usage event comprises an event in which an online service is accessed.

4. The method of claim 1, wherein instantiating a personal slice within the core network configured to handle the upcoming predicted usage event comprises identifying a number of computing resources associated with the upcoming predicted usage event and allocating the number of computing resources to the personal slice.

5. The method of claim 4, wherein the number of computing resources represents a minimum necessary computing resources required to process the network traffic associated with the upcoming predicted usage event.

6. The method of claim 1, wherein the upcoming predicted usage event includes an execution of a mobile application associated with the first user account, further comprising:
predicting a predicted end time for the execution of the mobile application associated with the first user account based on predicted future usage data of the upcoming predicted usage event; and
uninstantiating the personal slice upon reaching the predicted end time for the execution of the mobile application associated with the first user account.

7. The method of claim 1, wherein the current status of the core network comprises an extent to which a current load on the core network takes up an available bandwidth of the core network.

8. The method of claim 7, wherein determining that the core network is inadequate to handle the upcoming predicted usage event comprises determining that a total of the current load and a load associated with the upcoming predicted usage event is greater than a predetermined threshold load.

9. The method of claim 8, wherein the threshold load comprises a percentage of the available bandwidth of the core network.

10. A computing device comprising:
a processor; and
a memory including instructions that, when executed with the processor, cause the computing device to, at least:
receive data usage information associated with a first user account;
generate, using the received data usage information, a predicted usage model for the first user account;
identify, based on the predicted usage model for the first user account, that a probability for an occurrence of an upcoming predicted usage event associated with the first user account within a predetermined amount of time exceeds a predetermined probability threshold;
in response to the probability for the occurrence of the upcoming predicted usage event exceeding the predetermined probability threshold, determine a current status of a core network associated with first user account;
upon determining, based on the current status of the core network, that the core network is inadequate to handle the upcoming predicted usage event, instantiate a personal slice within the core network dedicated to handle the upcoming predicted usage event associated with the first user account; and
upon identifying network traffic associated with the upcoming predicted usage event, route that network traffic through the personal slice.

11. The computing device of claim 9, wherein the upcoming predicted usage event includes an execution of a mobile application associated with the first user account.

12. The computing device of claim 11, wherein the instructions further cause the computing device to:
predict a predicted end time for the execution of the mobile application associated with the first user account based on predicted future usage data of the upcoming predicted usage event; and
uninstantiate the personal slice upon reaching the predicted end time for the execution of the mobile application associated with the first user account.

13. The computing device of claim 9, wherein the first user account is associated with one or more user devices.

14. The computing device of claim 13, wherein the network traffic associated with the upcoming predicted usage event is identified based on it originating from, or being directed to, the one or more user devices.

15. The computing device of claim 9, wherein the instructions further cause the computing device to uninstantiate the personal slice at a conclusion of the upcoming predicted usage event.

16. The computing device of claim 9, wherein the core network comprises a main slice and another personal slice associated with a second user account.

17. The computing device of claim 16, wherein the another personal slice is dedicated to a particular type of network traffic.

18. A non-transitory computer-readable media collectively storing computer-executable instructions that upon execution cause one or more computing nodes to collectively perform acts comprising:
generating, using data usage information, a predicted usage model for a first user account;
identifying, based on the predicted usage model for the first user account, that a probability for an occurrence of an upcoming predicted usage event associated with the first user account within a predetermined amount of time exceeds a predetermined probability threshold;
in response to the probability for the occurrence of the upcoming predicted usage event exceeding the predetermined probability threshold, determining a current status of a core network associated with the first user account;
upon determining, based on the current status of the core network, that the core network is inadequate to handle the upcoming predicted usage event, instantiating a personal slice within the core network dedicated to handle the upcoming predicted usage event associated with the first user account; and
upon identifying network traffic associated with the upcoming predicted usage event, routing that network traffic through the personal slice.

19. The non-transitory computer-readable media of claim 18, wherein the core network comprises a main slice and another personal slice associated with a second user account.

20. The non-transitory computer-readable media of claim 19, wherein the another personal slice is dedicated to a particular type of network traffic.

* * * * *